Aug. 25, 1925.
Re. 16,147
H. C. EGERTON
SIGNALING SYSTEM
Original Filed Dec. 27, 1918
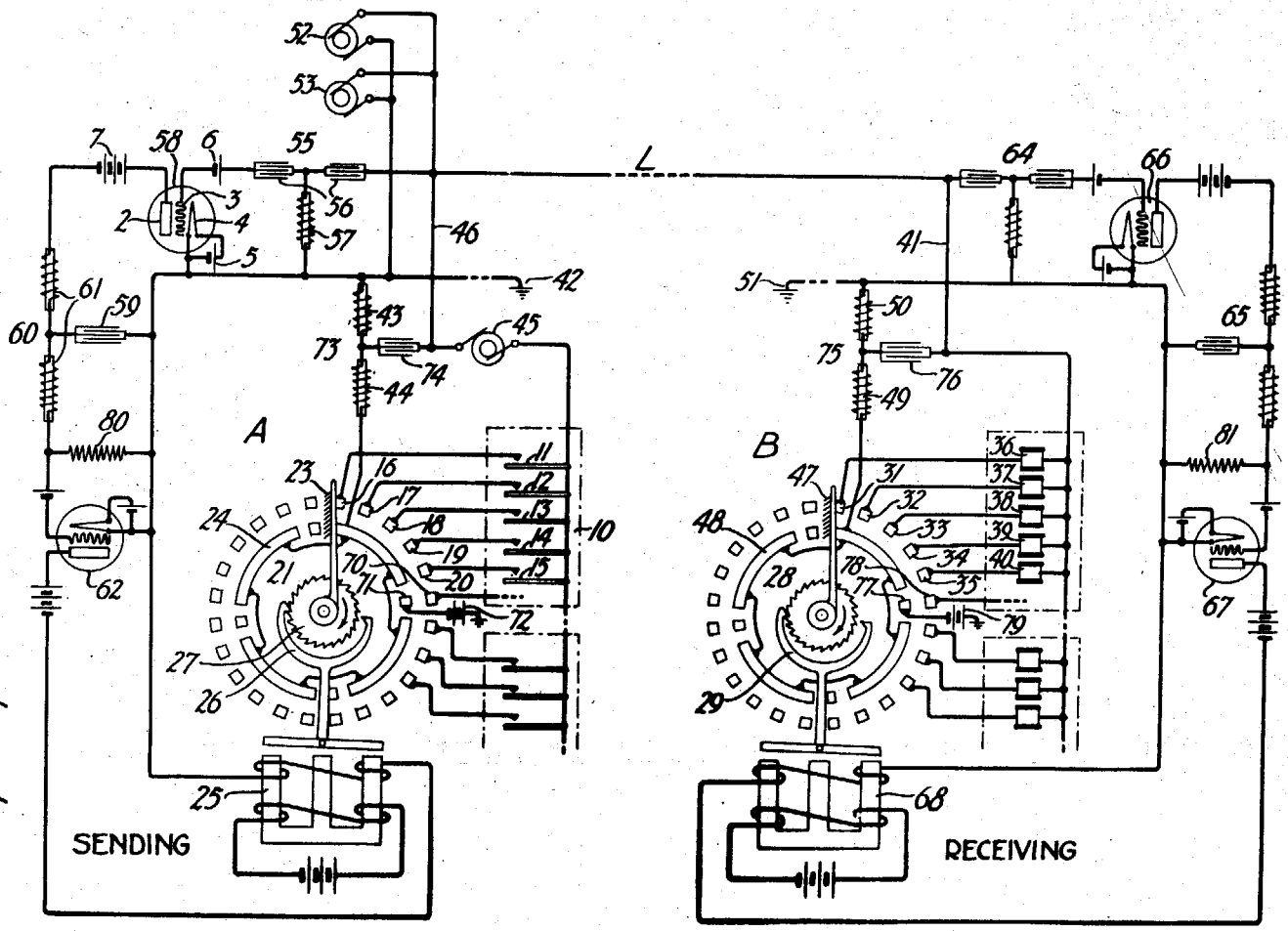
Inventor:
Henry C. Egerton
by E. W. Adams Att'y.

Reissued Aug. 25, 1925. Re. 16,147

UNITED STATES PATENT OFFICE.

HENRY C. EGERTON, OF MADISON, NEW JERSEY, ASSIGNOR TO WESTERN ELECTRIC COMPANY, INCORPORATED, OF NEW YORK, N. Y., A CORPORATION OF NEW YORK.

SIGNALING SYSTEM.

Original No. 1,400,039, dated December 13, 1921, Serial No. 268,482, filed December 27, 1918. Application for reissue filed April 30, 1923. Serial No. 635,714.

*To all whom it may concern:*

Be it known that I, HENRY C. EGERTON, a citizen of the United States, residing at Madison, in the county of Morris, State of New Jersey, have invented certain new and useful Improvements in Signaling Systems, of which the following is a full, clear, concise, and exact description.

This invention relates to electric signaling systems, and more particularly to the production and utilization of impulses for synchronizing purposes.

The principal object of this invention is to combine a plurality of high frequency currents in such a manner that the resultant frequency or beat oscillations may be employed to keep a plurality of movable members in unison or synchronism, this condition to be insured regardless of whether signaling impulses are being transmitted or not.

The invention contemplates the employment of two alternating current sources giving different frequencies connected in series or parallel and arranged to feed into a repeater or line circuit. If two alternating current sources having slightly different frequencies are impressed upon a line circuit, beat oscillations are produced the most important of which have a frequency equal to the difference in the frequencies of the two sources. If the two different frequencies are sent into a vacuum tube repeater, not only the original frequencies come out, but also a low electrical oscillation, the frequency of which depends upon the number of beats occurring due to combining the two currents of higher frequencies. It is this low frequency current which it is proposed to use for maintaining synchronism. These beats may be manifested as a sound or noise in a receiving instrument or as illustrated in the present application, they may be employed for performing work such as the operation of an electromagnet. The production of beat oscillations in the present instance is accomplished by generating two frequencies, for example, oscillations of 400 and 404 cycles and these frequencies may in a telegraph system be superimposed on the signaling currents without interfering with the effective transmission of the latter.

The above and other objects of this invention will be set forth in the following description and claims and will be more readily understood by reference to the accompanying drawing wherein the invention is disclosed as applied to a printing telegraph system of the rotary distributer type.

In the accompanying drawing A represents a sending station and B a receiving station. At station A there is provided one or more impulse transmitters 10, each comprising a group of selectively operable transmitter contacts 11, 12, 13, 14 and 15. The contacts are connected to a source of A. C. signaling current 45 and are adapted when actuated to connect source of current 45 to corresponding segments 16, 17, 18, 19 and 20 respectively of distributer 21.

The transmitter 10 may be of the keyboard type or it may consist of an automatic transmitter operated by a perforated tape or the like. If an automatic transmitter is employed the segments 70 and 71 may be used to connect battery 72 over the distributer brush 23 to a suitable magnet (not shown) for advancing the perforated type.

A distributer arm 22 carries a brush 23 which is adapted to sweep over the segments of the distributer face and connect the segments of each group sequentially with a common ring 24 which, as illustrated, comprises a plurality of segments strapped together. The distributer brush arm 22 is preferably normally under tension tending to rotate and its rate of travel may be governed by electromagnet 25 through the instrumentality of the escapement mechanism 26 and ratchet 27 or the distributer brush arm 22 may be positively driven by a ratchet and pawl mechanism similar to the escapement mechanism illustrated.

At station B there is provided a rotary distributer 28, escapement mechanism 29, etc., which is similar to the mechanism described at station A. Connected to segments 31, 32, 33, 34 and 35 of distributer 28 are receiving magnets 36, 37, 38, 39 and 40 respectively. Whenever any of the transmitter contacts 11 to 15 are closed and the distributers are set in operation corresponding receiving magnets 36 to 40 will be operated by current from source 45. For example, if transmitter contacts 11 and 14 are closed, circuits will be completed sequentially from ground 42, impedance 43 and 44, distributer ring 24, brush 23, segment 16, contact 11, to source of current 45, and from brush 23, segment 19, contact 14 to source of current 45, thence by conductor 46, line L, conductor 41, to receiving magnets 36 and 39, segments 31 and 34, respectively, brush 47, distributer ring 48, impedance 49 and 50 to ground at 51. Circuits through other receiving magnets would be established in a like manner by the closure of additional transmitter contacts. The receiving magnets may be employed to operate selecting mechanism of a receiving printing telegraph or they may be employed in connection with any suitable receiving or recording device. The generator 45 may be assumed, for example, to produce a low frequency signaling current of 60 or 75 cycles. If desired, a source of direct current battery may be substituted for signaling current in place of the alternating current source 45.

Two sources of alternating currents from which the synchronizing oscillations are derived are represented at 52 and 53. The generator 52 may be assumed, for example, to generate a frequency of 400 cycles and the generator 53 may be assumed to generate a frequency of 404 cycles, although other frequencies may obviously be employed. These sources are arranged to impress currents on the line L which also carries the signaling currents and it is therefore necessary to provide suitable filters and amplifiers to prevent interference between the synchronizing currents and the signaling currents and to enable the beat oscillations to effect the operation of the synchronizing mechanism.

The filter 55 comprising one or more condensers 56 and inductive resistance 57 may be arranged to admit, for example, a minimum of 150 cycles thereby admitting the assumed higher frequencies and not the signaling frequency. Associated with the filter 55 is a repeater or combiner 58 which is a three element vacuum tube of the audion type and which takes up the two original frequencies and gives out in addition to the original frequencies the summation of the two frequencies and the difference in the two frequencies or the beat frequency. The filament 4 of the repeater is heated by battery 5, the grid 3 is supplied with negative potential by means of battery 6 and the space current in the output circuit 2 is supplied by battery 7. Connected to the output circuit 2 of the repeater 58 is a filter 60 comprising a condenser 59 and inductive resistance 61 which is arranged to admit the beat frequency only, or in the present case say a maximum of 5 cycles. These filtered beat oscillations are then sent into a vacuum tube amplifier 62 and amplified sufficiently to effect the operation of the distributer magnet 25. The magnet 25 is shown in the present instance as controlling the escapement mechanism of a continuously driven distributer, which may be frictionally connected to the shaft of a motor.

At station B are provided filters 64 and 65, a repeater 66 and an amplifier 67 which correspond to filters 55 and 60, repeater 58 and amplifier 62, respectively at station A. Across the output circuits of filters 60 and 65 are connected resistances 80 and 81, respectively. These resistances are employed to permit the proper operation of repeaters 58 and 66. The filters, repeater and amplifier at station B are arranged to permit the beat oscillations to effect the operation of distributer magnet 68 and cause it to step a distributer 28 in synchronism with the distributer 21. The means provided at station B for filtering, repeating and amplifying the synchronizing currents is a duplication of that already described in connection with station A and therefore a detailed description of the apparatus at station B is believed to be unnecessary.

While the magnets 25 and 68 are shown as controlling the escapement mechanism of continuously driven distributer arms, the magnets may be employed to operate La Cour motors as are well known in the art or they may be employed to control the correcting mechanism of a synchronizing system such as disclosed in a copending application, Serial No. 129,462 filed November 4, 1916 for Paul M. Rainey.

At station A is a filter 73 comprising a condenser 74 and inductive resistance 43 and 44, and at station B is a corresponding filter 75 comprising a condenser 76 and inductive resistance 49 and 50. Each of these filters is arranged to admit only the signaling current oscillations or, for example, a maximum of 150 cycles.

Associated with each quadrant of the receiving distributer is a pair of local segments 77 and 78 which may be utilized to conduct current from battery 79 over the distributer brush 47, to a printing magnet (not shown) to record the characters as determined or set up by the selective operation of the magnets 36 to 40, inclusive.

This invention is not limited to the employment of the particular synchronizing frequencies designated or to the particular type of synchronizing apparatus illustrated but is intended to cover broadly the employment of beat oscillations or the oscillations produced by the combination of a plurality of unequal current frequencies for maintaining synchronism between a plurality of movable members.

What is claimed is:

1. The method of maintaining synchronism between two rotatable members operatively interconnected by a transmission line and adapted to be operated by independent sources of motion which consists in sending over said line currents of different frequencies, and employing the beat oscillations produced by combining said frequencies to control the operation of said rotatable members.

2. Electrical synchronizing apparatus comprising means for impressing on a line circuit currents of predetermined character, means for combining the currents to produce beat oscillations, and means controlled by the beat oscillations for maintaining synchronism.

3. In a synchronizing system the combination of a transmission line, means for applying currents of different frequencies to said line, a plurality of members to be synchronized, and means responsive to the beat oscillations produced by said different frequencies for controlling the operation of said members.

4. In a synchronizing system the combination of a transmission line, means for applying currents of different frequencies to said line, a plurality of rotatable members, devices for controlling the rotation of said members, and means responsive to the beat oscillations produced by said currents for operating said devices.

5. Electrical synchronizing apparatus comprising a sending station and a receiving station, a transmission line interconnecting said stations, distributer mechanism at each of said stations, means for impressing upon the line a plurality of currents of different frequencies, means for altering the frequency of said currents, and means responsive to the altered frequency for controlling the said distributers.

6. Electrical synchronizing apparatus comprising a sending station and a receiving station, means at the sending station for transmitting groups of signaling impulses, means at the receiving station responsive to the impulses transmitted from the sending station, independently driven distributers at each of said stations, means for transmitting a plurality of synchronizing currents of different frequencies, means at each of said stations for separating the signaling currents from the synchronizing currents, means at each of said stations for altering the synchronizing currents, and means at each of said stations responsive to the altered currents for operating said distributers in synchronism.

7. Electrical synchronizing apparatus comprising a transmitting station and a receiving station interconnected by a transmission line, movable members at each of said stations, means at the transmitting station for transmitting signaling impulses, means for superimposing on the signaling impulses currents of high frequency, means at the receiving station responsive to the signaling impulses, and means at each of said stations responsive to the high frequency currents for maintaining said members in synchronism.

8. Electrical apparatus comprising a sending station and a receiving station, means at the sending station for transmitting groups of signaling impulses, means at the receiving station responsive to the impulses transmitted from the sending station, electromagnetic apparatus at each of said stations, means for transmitting a plurality of currents of different frequencies, means at each of said stations for separating the signaling currents from the said currents of different frequencies, means at each of said stations for altering said currents of different frequencies and means at each of said stations responsive to the altered currents for operating said electromagnetic devices.

9. A line section, two pairs of current paths electrically associated respectively with the terminals of said section, filtering means at each terminal of said section to prevent current lying in one band of frequencies from flowing in one of said paths and current lying in a second band of frequencies from flowing in the other of said paths at that terminal, means for impressing upon said line section a composite current wave comprising two and only two sinusoidal components, said components lying within one of said frequency bands, means responsive to the conjoint action of said components, and means for generating and impressing upon said line section current waves lying within the other of said bands of frequencies.

10. A line section, two pairs of current paths electrically associated respectively with the terminals of said section, filtering means at each terminal of said section to prevent current lying in one band of frequencies from flowing in one of said paths and current lying in a second band of frequencies from flowing in another of said paths at the same terminal, means for impressing upon said line section a composite current wave comprising two and only two sinusoidal components, said components lying within one of said frequency bands, and a wave distorting means at one terminal of said line section remote from said point for combining said sinusoidal components to produce an electromotive force of frequency within the second of said band of frequencies, means selectively responsive to the electromotive force of the frequency produced by said distorting means, and means for generating and impressing upon said line section current waves lying within the second of said bands of frequencies.

11. A line section, separate pairs of current paths electrically associated with the terminals respectively of said line section, filtering means at each end of said section to divert current lying in one band of frequencies to one of said paths and current lying in a second band of frequencies to another of said paths, means for impressing upon said line section a composite current wave comprising two and only two sinusoidal components, said components lying within one of said frequency bands, wave distorting means at one end of said line section remote from said point for combining said sinusoidal components to produce an electromotive force of frequency different than either of said components, means selectively responsive to the electromotive force of said last-mentioned frequency controlled by said last-mentioned electromotive force, and means for generating and impressing upon said line section current waves lying within the other of said bands of frequencies.

12. A line section, a pair of current paths electrically associated respectively with the terminals of said line section, filtering means at each terminal of said section to prevent current lying in one band of frequencies from flowing in one of said paths and current lying in a second band of frequencies from flowing in another of said paths at the same terminal, separate generators for generating two sinusoidal waves of different frequencies respectively, said frequencies lying within one of said frequency bands, means remote from said generators operated by the conjoint action of said waves of different frequency, and means for generating and impressing upon said line section current waves lying within the second of said band of frequencies.

13. The combination of a transmission line, means for applying currents of different frequencies to said line, a plurality of rotatable members, devices for controlling the rotation of said members, and means responsive to the beat oscillations produced by said currents for operating said devices.

In witness whereof, I hereunto subscribe my name this 25th day of April, 1923.

HENRY C. EGERTON.